US009551318B2

(12) United States Patent
Gochev (10) Patent No.: US 9,551,318 B2
(45) Date of Patent: Jan. 24, 2017

(54) HVATA-HYBRID VERTICAL AXIS TURBINE ASSEMBLY OPERABLE UNDER OMNI-DIRECTIONAL FLOW FOR POWER GENERATING SYSTEMS

(71) Applicant: Kiril Stefanov Gochev, Grayslake, IL (US)

(72) Inventor: Kiril Stefanov Gochev, Grayslake, IL (US)

( * ) Notice: Subject to any disclaimer, the term of this patent is extended or adjusted under 35 U.S.C. 154(b) by 0 days.

(21) Appl. No.: 14/140,545

(22) Filed: Dec. 26, 2013

(65) Prior Publication Data

US 2014/0205462 A1 Jul. 24, 2014

Related U.S. Application Data

(60) Provisional application No. 61/745,790, filed on Dec. 25, 2012.

(51) Int. Cl.
*F01D 5/12* (2006.01)
*F03D 3/06* (2006.01)

(52) U.S. Cl.
CPC ........... *F03D 3/061* (2013.01); *F05B 2250/25* (2013.01); *Y02E 10/74* (2013.01)

(58) Field of Classification Search
CPC ............ F01D 5/12; F01D 5/141; F01D 5/142; F01D 5/148
USPC ............ 415/71, 4.2, 4.4, 907; 416/176, 177, 416/223 R, 23, 24, 132 B, 196 A, DIG. 9; 290/44
See application file for complete search history.

(56) References Cited

U.S. PATENT DOCUMENTS

| | | | | |
|---|---|---|---|---|
| 7,084,523 B2* | 8/2006 | Noguchi | ................ | F03D 3/005 290/54 |
| 8,061,993 B2* | 11/2011 | Sassow | ................ | 416/176 |
| 8,215,897 B2* | 7/2012 | Douglass | ................ | F03D 3/065 290/44 |
| 8,308,424 B2* | 11/2012 | Park et al. | ................ | 415/71 |
| 2008/0217925 A1* | 9/2008 | Boone et al. | ................ | 290/55 |
| 2010/0233919 A1* | 9/2010 | Ersoy | ................ | 440/8 |
| 2010/0322770 A1* | 12/2010 | Sheinman | ................ | F03D 3/061 416/176 |
| 2012/0061968 A1* | 3/2012 | Burrell | ................ | 290/55 |
| 2014/0079534 A1* | 3/2014 | Murphy | ................ | F03D 3/005 415/4.2 |

* cited by examiner

Primary Examiner — William Gilbert (57) ABSTRACT

A hybrid, vertical axis helical turbine assembly capable of providing unidirectional rotation under an omni-directional low speed obverse fluid flow (gas or liquid), respectively gas flow is disclosed. The assembly comprises a minimum (but not limited to) of three hybrid (airfoil enhanced helical vane profile) wings, which are substantially spaced from the vertical axis (Z) and circumferentially spaced from one another. Each hybrid wing is fixed to the center hub in a rigid position by two or more arms, which are symmetrically located from each other in conjunction with the hub's horizontal axis (X). The hybrid, vertical axis helical turbine assembly provides high torque at very low wind speed because of the absolute symmetric airfoil enhanced helical vane profile wing, which design maintain adaptive lift to drag ratio over the one rotational revolution time line in coincidence of the upwind direction. These characteristics make the hybrid, vertical axis helical turbine assembly suitable for urban off grid and grid tie applications in low wind speed areas and areas of reputable wind turbulence.

1 Claim, 8 Drawing Sheets

HVATA-HYBRID VERTICAL AXIS TURBINE ASSEMBLY OPERABLE UNDER OMNI-DIRECTIONAL FLOW FOR POWER GENERATING SYSTEMS

CROSS-REFERENCE TO THE RELATED APPLICATION

This application claims priority from U.S. Provisional Patent Application No. 61/745,790, filed Dec. 25, 2012, entitled "HVATA—HYBRID VERTICAL AXIS TURBINE ASSEMBLY OPERABLE UNDER OMNI-DIRECTIONAL FLOW FOR POWER GENERATING SYSTEMS" the contest of which are incorporated herein by reference.

FIELD OF THE INVENTION

This invention relates to turbines and more particular to turbines capable of unidirectional rotation under omni-directional fluid flows for the use as a part of power generating systems

BACKGROUND OF THE INVENTION

Existing vertical Axis turbines have a number of problems including pulsing power cycle; airfoils variable angle of attack (AoA); very high centrifugal stresses on the structure and axial pressure on the bearings. Further, increasing of tip speed ratio (TSR) on specific types, design and modifications cause decrease of torque especially at low fluid flow (upwind speed). The present invention provides a design of vertical axis turbine assembly in which at least some of the abovementioned problems are alleviated or fully remedied.

SUMMARY OF THE PRESENT INVENTION

1.) In accordance with one aspect of the present invention, provided is a vertical axis turbine assembly characterized by a plurality of elongated turbine wings rigidly mounted about a shared central axis (Z), each turbine wing having an airfoil enhanced helical vane profile with a continuously curved inner foil surface and a cut-away portion on an outer foil surface.

2.) In accordance with a further aspect of the present invention, provided is a vertical axis turbine assembly characterized by a plurality of elongated turbine wings rigidly mounted about a shared central axis (Z), each turbine wing having an airfoil enhanced helical vane profile, which is formed as a result of 60° left (against counterclockwise) rotational twist from bottom to top around axis (Z) at the distance equal to turbine's radius (D/2).

3.) In accordance with an further aspect of the present invention, provided is a vertical axis turbine assembly characterized by a plurality of elongated turbine wings rigidly mounted about a shared central axis (Z), each turbine wing having an airfoil shaped profile with a continuously curved inner foil surface, wherein the turbine wing profiles are disposed at an angle of less than 90° to a radius line extending from the axis.

4.) In accordance with a yet further of the present invention, provided is a vertical axis turbine assembly characterized by a plurality of elongated turbine wings rigidly mounted about a shared central axis (Z), each turbine wing having an airfoil shaped profile within a continuously curved inner foil surface, wherein each wing is connected to the shared central hub (perpendicular to axis Z and located in the geometric center of the turbine assembly) by concentrically symmetric arms.

DESCRIPTION OF THE DRAWINGS

Other features and advantages of the invention will be entirely understood from the following detailed description taken in conjunction with the accompanying drawings in which.

DETAILED DESCRIPTION OF THE INVENTION

FIGS. 1 to 8 and the following description represent certain examples to inform those knowledgeable in the art how to make and use the best means of the invention. For the purpose of educating inventive principles, some conventional aspects have been simplified or omitted. Those knowledgeable in the art will appreciate variations from these examples that fall within the scope of the invention. Those knowledgeable in the art will appreciate that the features described below can be combined in various ways to form multiple variations of the invention. As a result, the invention is not limited to the specific examples described below, but only by the claims and their equivalents.

Figure 1:
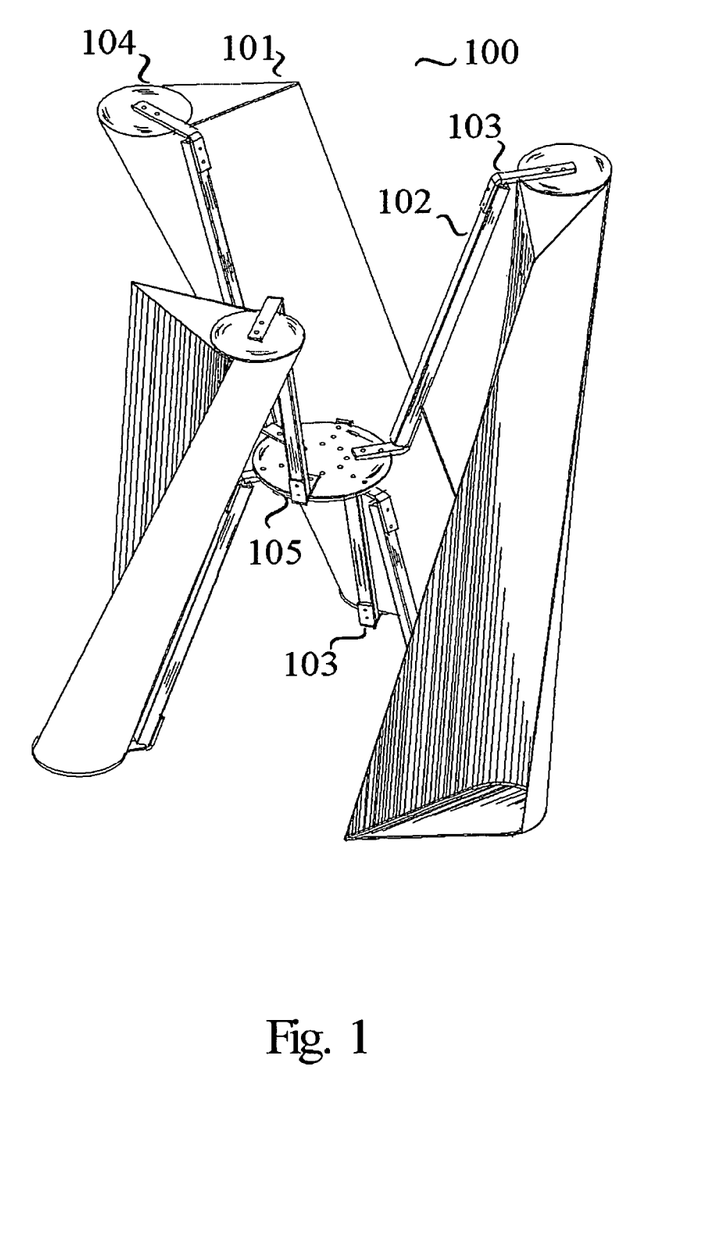
FIG. 1 is a perspective view of the hybrid vertical axis turbine assembly according to the present invention.
Figure 2:
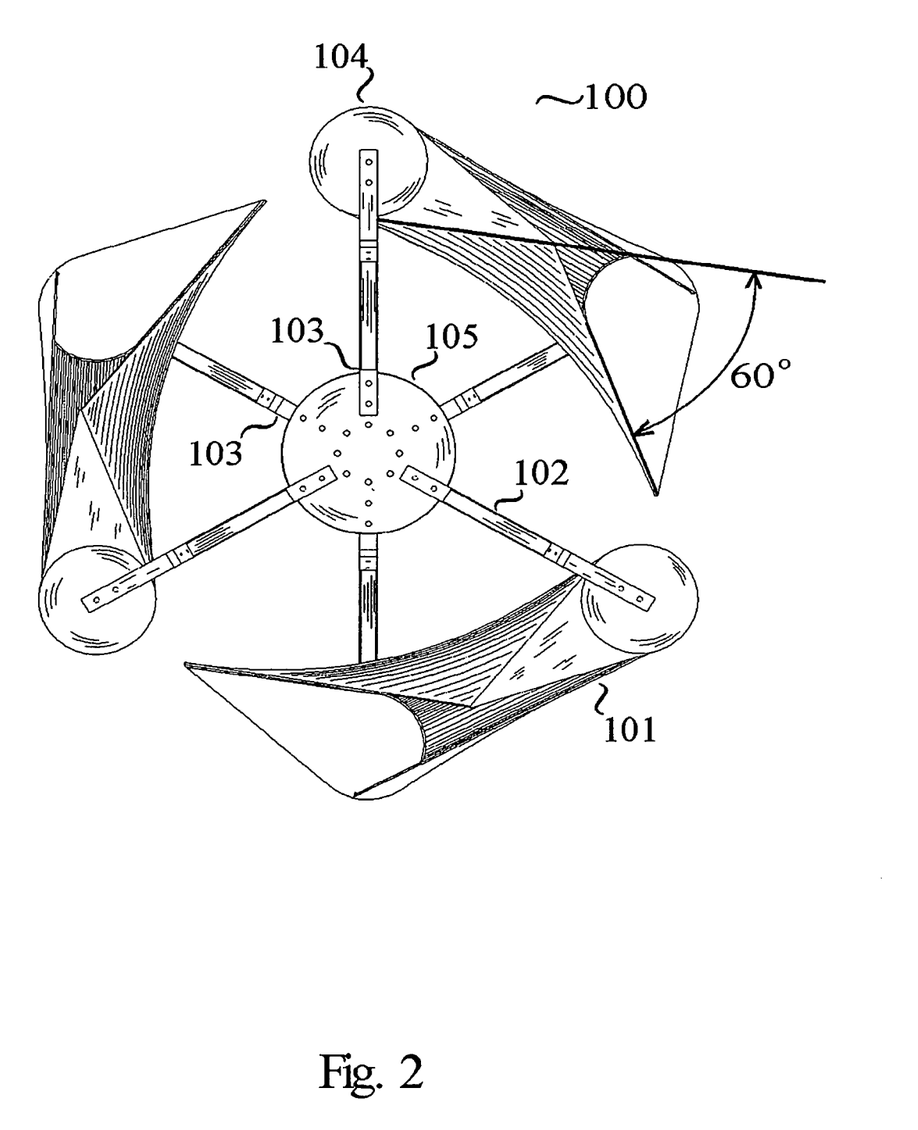
FIG. 2 is a top view of the hybrid vertical axis turbine assembly according to the present invention.
Figure 3:
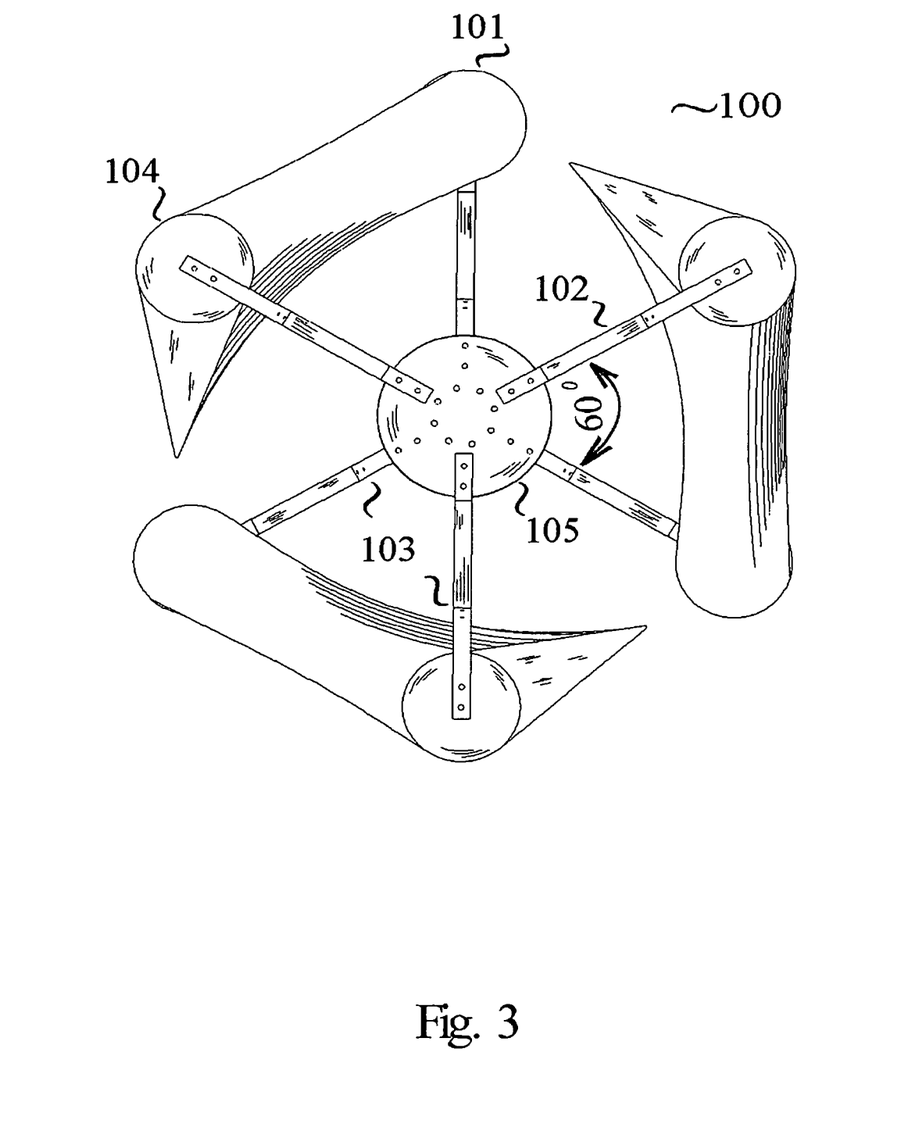
FIG. 3 is a bottom view of the hybrid vertical axis turbine assembly according to the present invention.
Figure 4:
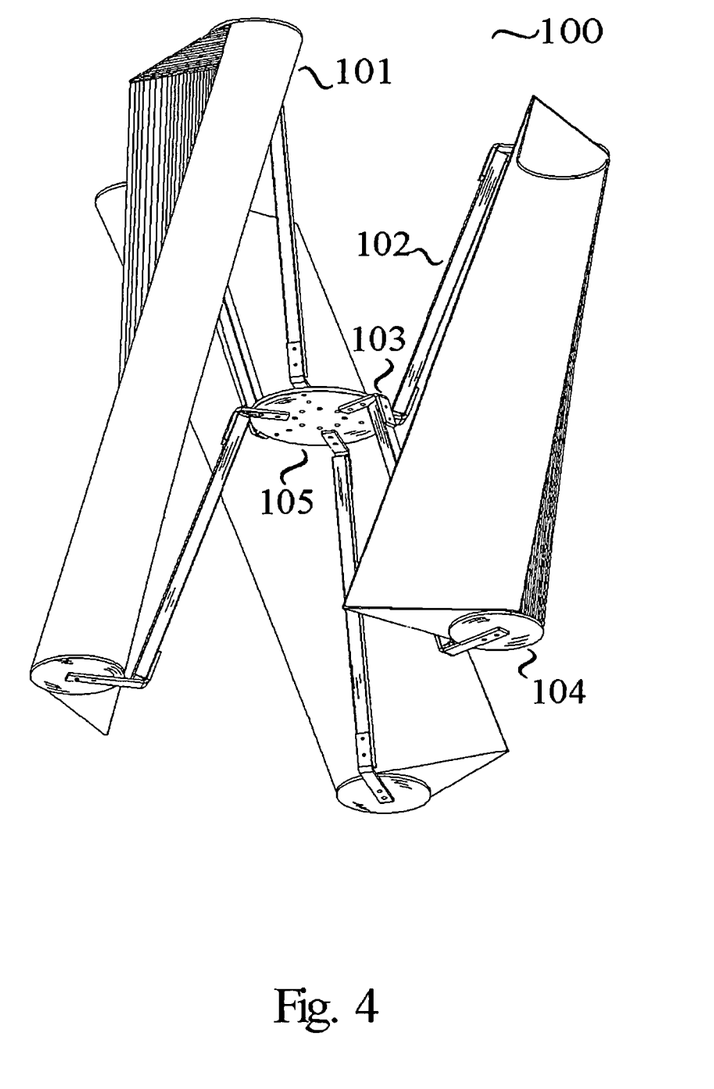
FIG. 4 is a bottom right side perspective view of the hybrid vertical axis turbine assembly according to the present invention, the left side, front and back views being identical thereto.
Figure 5:
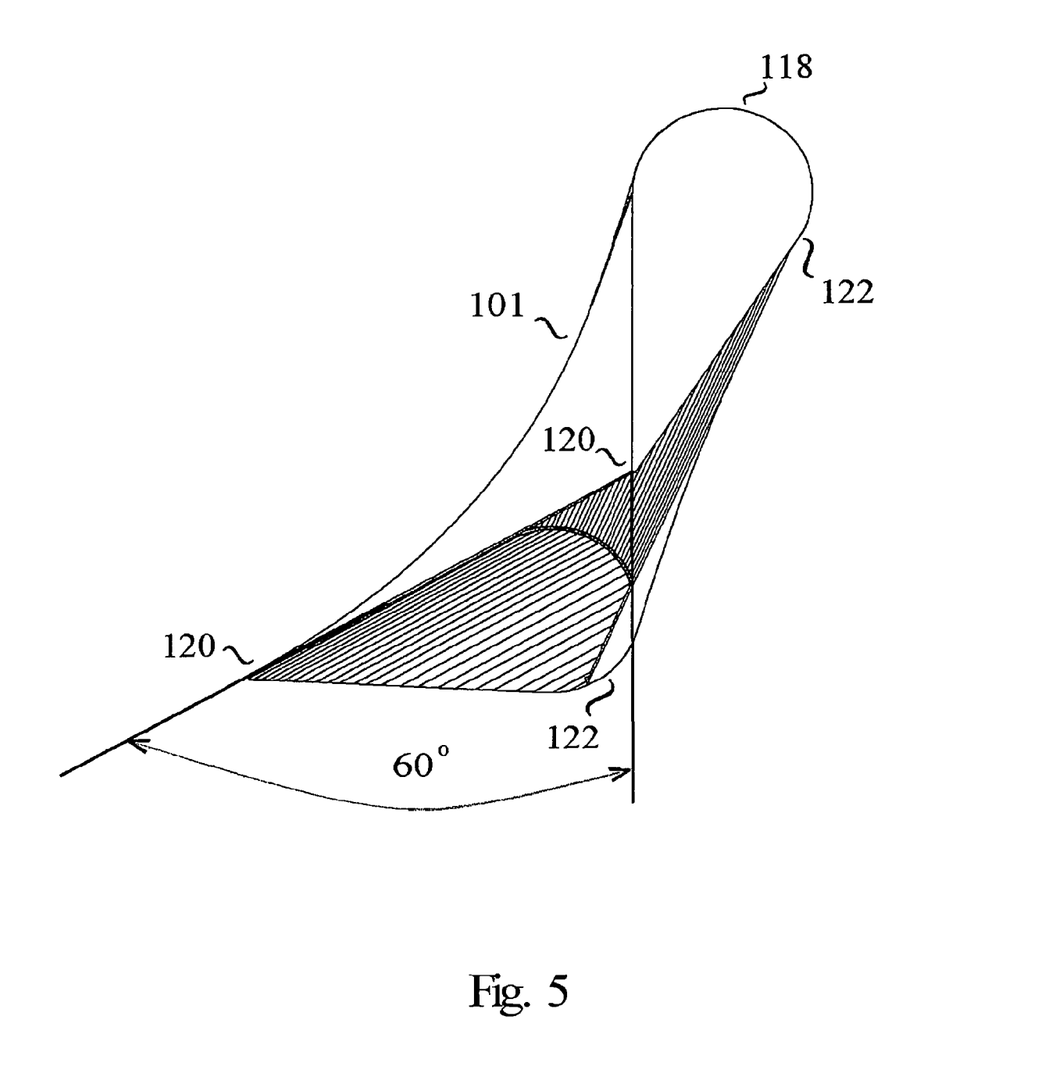
FIG. 5 is a perspective view of a wing of the hybrid vertical axis turbine assembly according to the present invention.
Figure 6:
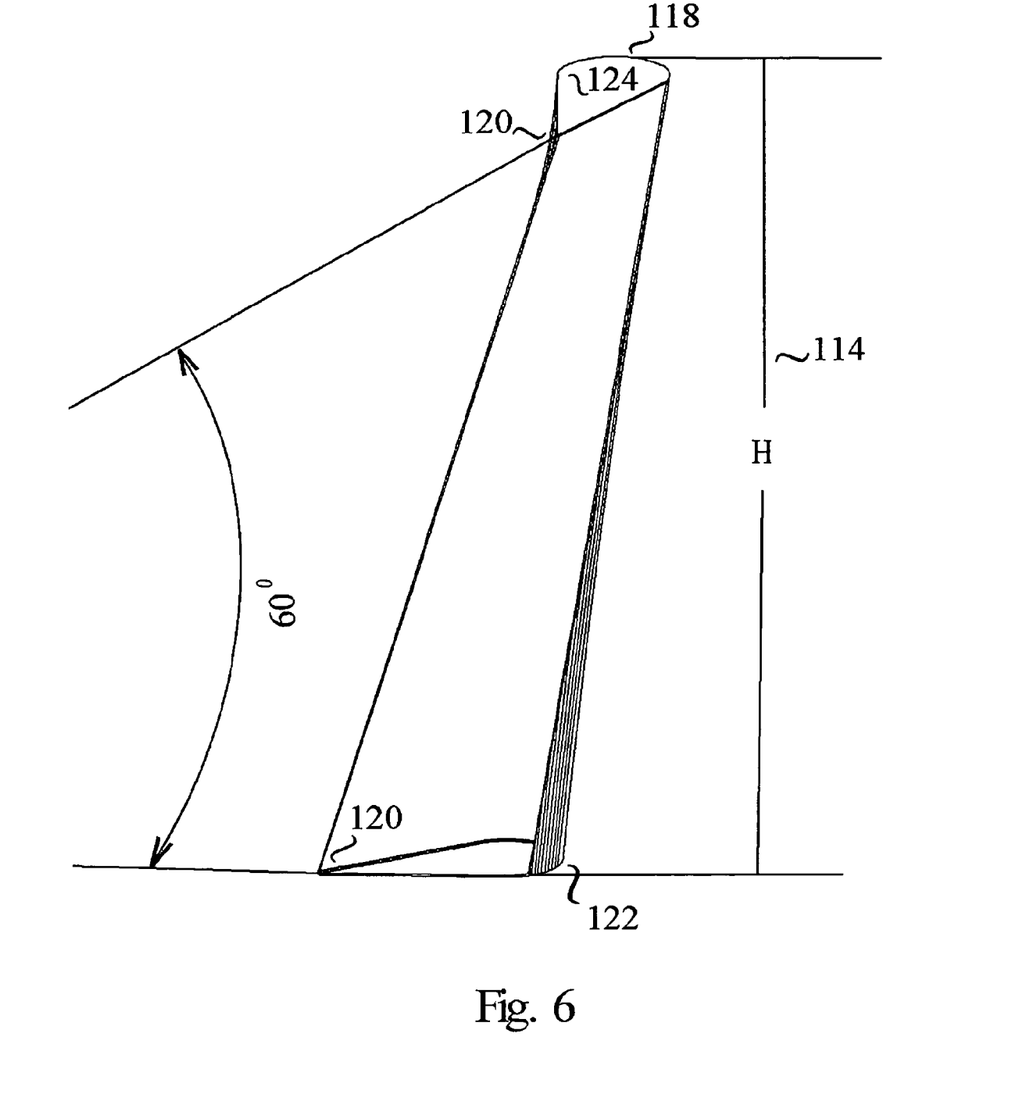
FIG. 6 is back side view of a wing of the hybrid vertical axis turbine assembly according to the present invention.

FIG. 1 shows a perspective view of the hybrid, vertical axis helical turbine assembly (HVATA) (100) according to an embodiment of the invention. It should be appreciated that the permanent magnet alternator (PMA) of the HVATA (100) is not shown for the purpose of clarity. The permanent magnet alternator (PMA) used may comprise any suitable (PMA) or other electro-mechanic generator as is known in the art.

Referring now to the drawings, the reference numerals which denote similar elements throughout the several views, where is shown and described the invention of hybrid, vertical axis helical turbine assembly (HVATA) capable of providing unidirectional rotation under an omni-directional low speed obverse fluid flow (gas or liquid), respectively gas flow. FIGS. 1 to 4 are perspective views illustrating the HVATA, generally designated (100), of the invention. As shown, the assembly (100) comprises a minimum (but not limited to) of three hybrid (airfoil enhanced helical vane profile) wings (101), which are substantially spaced from the vertical axis (Z) and circumferentially spaced from one another. Each hybrid wing (101) is fixed to the center hub (105) in a rigid position by two or more arms (102) and angular brackets (103), which are symmetrically located from each other in conjunction with the hub's (105) horizontal axis (X), but closing a 60 degree angle in relation with axis (Y). Each of the plurality of the airfoil enhanced vane profile helical wings (101) is designed and pivotally carried on the assembly (100), with a control means to maintain a relatively constant angle of attack (B) (112) to a relative wind vector in any of the 360° positions over the turbines diameter (D) (113) for the entire height (H) (114) of the assembly (100) in any given increment of the one revolution time line.

The HVATA (100) further comprises a plurality, in this case three, of hybrid airfoil enhanced helical vane profile wings (101). The wings (101) are equal spaced FIGS. 1 to 4.

Figure 7:
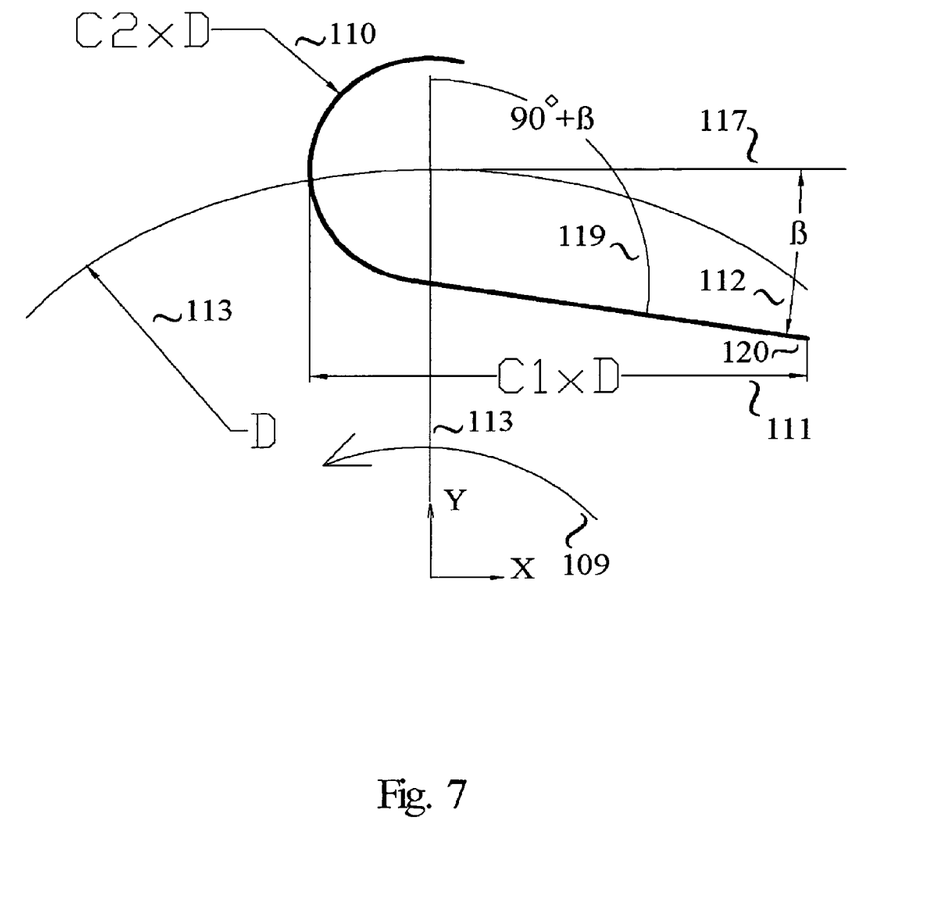
FIG. 7 shows geometry and positioning example of the cross-sectional top view of a turbine wing useful to the present invention.

The shape of each wing (101) comprises an outer low pressure lift producing curved surface (122), said defined in a planar direction, and said bordered on the top and bottom part of the wing's front areal surface with a leading edge (118), and continuing said all the way to a trailing edge (120); an inner relatively high (ambient/upwind) pressure surface (124), is defined in a planar direction, and said bordered on the top and bottom part of the wing from the same leading edges (118) and (120), as said an offset reflection of the outer low pressure surface, were said leading edge (118) and trailing edge (120) are said in relationship defined and noted in FIG. 7; Thus, said an outer interruption of two dimensional linear continuity between leading edge (118) and trailing edge (120) in a planer direction has defined said a gap said position on the outer side of the wing's shape; Therefore, as said an air flow force appears, said a plurality of wings shall move said into direction indicated by arrow (109) around said vertical axis Z; Thus an ambient/upwind (107) said generated by the air flow force said will approach an inner surface (124) of said one of the plurality of wings (101), a drag force (108) will be generated said in the same general direction as said the main turbine spin (109); furthermore, as the ambient/upwind (107) said will approach an outer surface (122) of said one of the plurality of wings (101) a lift force (106) will be generated and said as result said an angular thrust force will pull the wing in the same general direction as said the main turbine spin (109) direction; Such a said sequence of relationship between ambient/upwind (107), said drag/lift forces, and said movement of the wings (101), respectively spinning of the turbine in the said noted direction (109), will facilitates start up and movement of the HVATA (100); furthermore, FIG. 5 and FIG. 6, shape of each wing embodies a 60-degree helical twist said extending in a planer direction between top and bottom surface plates in relation to the vertical axis, and said it does in performance said respectively high torque at said very low wind speed;

On the horizontal surface of the center hub (105), said tree of the described above said symmetric airfoil enhanced helical vane profile wings are positioned said at 60-degree angle towards each other, said forming structure in a planer direction from top to bottom, said able to maintain adaptive lift to drag ratio over the one rotational revolution time line said in coincidence of the upwind direction.

The dual, said adaptive lift to drag ratio performance in dependence of each wing positioning said towards ambient/upwind direction over the one rotational revolution, has defined said variable tip-speed ratio (TSR), and said increasing efficiency at low wind speed said safety in high wind speeds, as well, reducing noise, vibration and turbine damage.

FIG. 7 shows section view from the wing (101) according to an embodiment of the invention and details said describing relation between turbine's diameter and wing's dimensioning, and said wing's position in correlation with the central axis.

Figure 8:
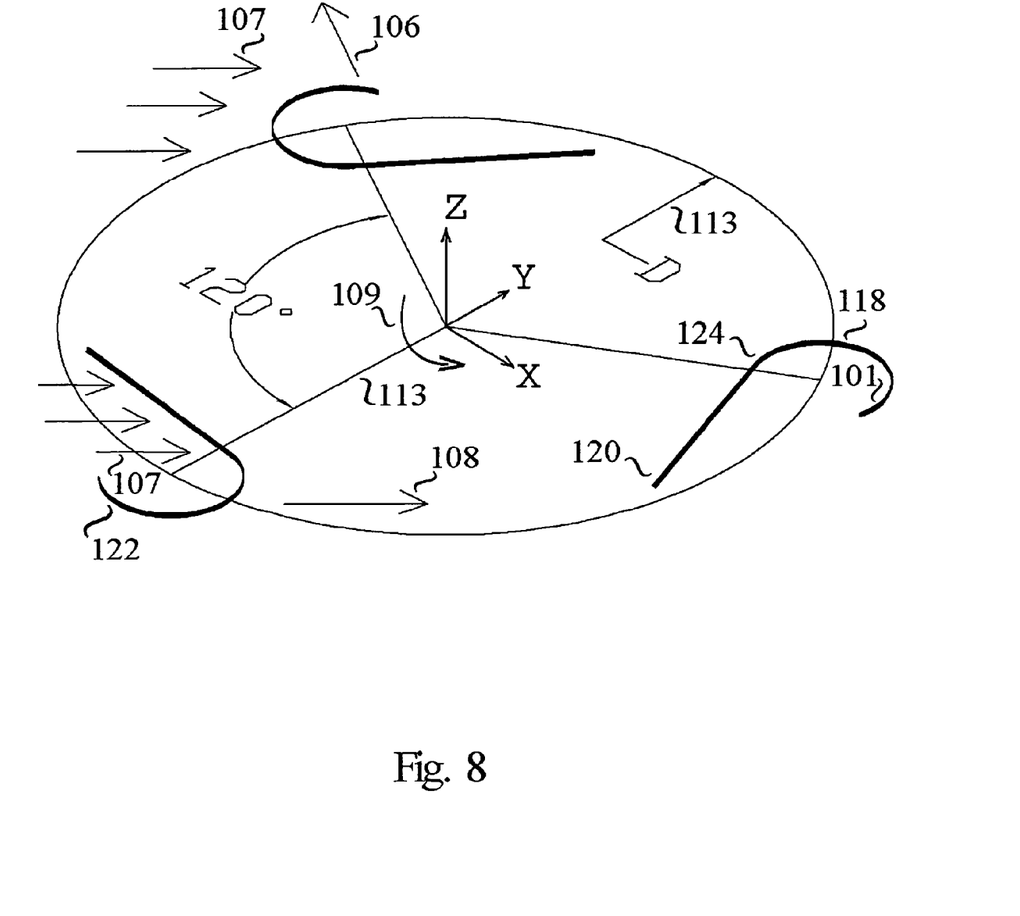
FIG. 8 is a cross-sectional top view of a hybrid vertical axis turbine assembly according to the present invention.

FIG. 8 shows section view from the turbine (100) according to an embodiment of the invention, were positioning of the wings are defined in said correlation to each other, and said in correlation with the center turbine axis; and said two dimensional section of the ambient/upwind vector (107) is shown in correlation with generated lift (106) and drag (108) forces.

Having in consideration that the principles of the invention have now been made comprehensible in illustrative embodiments, there will be at once obvious to those skilled in the art modifications of structure, proportions, and elements, materials, and components, used in the observe of the invention, which are particularly adapted for specific environments and operating requirements without departing from those principles. This invention is not to be limited by what has been described except as designated by the appended claims.

What is claimed is:

1. A vertical axis helical turbine assembly comprising:
   a first wing, a second wing and a third wing placed circumferentially with respect to each other about a vertical axis of a center hub,
   each respective wing having a first end with a first midpoint and a second end with a second midpoint, each said respective wing having a respective first arm connected from said first end to said hub and a respective second arm connected from said second end to said hub;
   each said respective wing having said first midpoint of said first end spaced sixty degrees from said second midpoint of said second end in a circumferential direction defined by a midpoint of said vertical axis;
   each said first end of each said respective wing having a curved first portion and a substantially triangular second portion, said substantially triangular second portion having a first side extending in a planar direction from a first point on said curved first portion and a second side extending in a planar direction to a second point on said curved first portion, said first side and said second side converging to each other to a first end second portion point,
   each said second end of each said respective wing having a curved first portion and a substantially triangular second portion, said substantially triangular second portion of each said second end having a first side extending in a planar direction from a first point on said curved first portion of each said second end and a second side extending in a planar direction from a second point on said curved first portion of each said second end, said first side of said second end and said second side of said second end converging to each other to a second end second portion point;
   each said first sides of said respective first end and said respective second end being more proximal to said vertical axis than said respective second sides;
   each said respective first end being connected to each said respective second end by a substantially solid member having a first edge extending from said first end second portion point to said second end second portion point, a second edge extending from an intersection of said respective second edge and said respective curved first portion of said first end to an intersection of said respective second edge of said respective curved first portion of said second end, a third edge extending from said first end second portion point to said intersection of said respective second edge and said curved first portion, and a fourth edge extending from said second end second portion point to said intersection of said respective second edge of said respective curved first portion of said second end;

said third edge and said fourth edge having a portion extending along said respective first side of said substantially triangular second portion.

* * * * *